(12) United States Patent
Kobayashi et al.

(10) Patent No.: US 11,460,425 B2
(45) Date of Patent: Oct. 4, 2022

(54) THERMAL ANALYZER

(71) Applicant: HITACHI HIGH-TECH SCIENCE CORPORATION, Tokyo (JP)

(72) Inventors: Kengo Kobayashi, Tokyo (JP); Shinya Nishimura, Tokyo (JP); Hirohito Fujiwara, Tokyo (JP)

(73) Assignee: HITACHI HIGH-TECH SCIENCE CORPORATION, Tokyo (JP)

( * ) Notice: Subject to any disclaimer, the term of this patent is extended or adjusted under 35 U.S.C. 154(b) by 0 days.

(21) Appl. No.: 17/130,233

(22) Filed: Dec. 22, 2020

(65) Prior Publication Data

US 2021/0285904 A1  Sep. 16, 2021

(30) Foreign Application Priority Data

Mar. 12, 2020  (JP) .............................. JP2020-061447

(51) Int. Cl.
*G01N 25/20* (2006.01)
*G01N 25/02* (2006.01)

(52) U.S. Cl.
CPC ............. *G01N 25/20* (2013.01); *G01N 25/02* (2013.01)

(58) Field of Classification Search
USPC ..................................... 374/10, 112, 208, 31
See application file for complete search history.

(56) References Cited

U.S. PATENT DOCUMENTS

| | | | | |
|---|---|---|---|---|
| 5,439,291 A | * | 8/1995 | Reading | B82Y 15/00 374/11 |
| 2011/0054829 A1 | * | 3/2011 | Yamada | G01K 17/00 702/136 |
| 2020/0400510 A1 | * | 12/2020 | Ito | G01K 11/12 |
| 2021/0190708 A1 | * | 6/2021 | Danley | G01K 19/00 |

FOREIGN PATENT DOCUMENTS

| | | |
|---|---|---|
| JP | 2001183319 A | 7/2001 |
| JP | 2015108540 A | 6/2015 |

OTHER PUBLICATIONS

Translation of JP2001183319A (Yamada) (Year: 2001).*

* cited by examiner

*Primary Examiner* — Mirellys Jagan
(74) *Attorney, Agent, or Firm* — Holland & Hart LLP

(57) ABSTRACT

Provided is a thermal analyzer, with which a sample can be observed even under a state in which a heat sink is cooled to a room temperature or lower. The thermal analyzer includes: the heat sink, in which a measurement sample container and a reference sample container are placed; a heat sink cover configured to cover the heat sink; a heat sink window provided in the heat sink; a heat sink cover window provided in the heat sink cover; an imaging device configured to image the sample in the heat sink through the heat sink window and the heat sink cover window; a purge gas introduction portion, through which a purge gas is introduced into the heat sink; and a discharge port, through which the purge gas is allowed to flow from one of the heat sink window and the heat sink to a space inside the heat sink cover.

5 Claims, 4 Drawing Sheets

THERMAL ANALYZER

The present application claims priorities to Japanese Patent Application No. 2020-061447, filed Mar. 12, 2020, the entire contents of which is incorporated herein for all purposes by this reference.

BACKGROUND OF THE INVENTION

1. Field of the Invention

The present invention relates to a thermal analyzer, which is configured to measure a physical change of a sample along with its temperature change caused by heating or cooling the sample, and which is used to observe the sample.

2. Description of the Related Art

As a technique of evaluating temperature characteristics of a sample, there has been employed a technique called thermal analysis for measuring a physical change of a sample along with its temperature change caused by heating or cooling the sample. A definition of thermal analysis can be found in JIS K 0129: 2005 "General rules for thermal analysis," and thermal analysis, according to this definition, includes all techniques that measure the physical properties of a measurement target (sample) under program-controlled temperatures. Common thermal analysis methods are (1) Differential Thermal Analysis (DTA) that detects temperatures (temperature difference), (2) Differential Scanning calorimetry (DSC) that detects a heat flow difference, (3) Thermogravimetry (TG) that detects masses (weight change), and (4) Thermomechanical Analysis (TMA) and (5) Dynamic Mechanical Analysis (DMA) that detect mechanical properties.

As an example of a thermal analyzer configured to perform Differential Scanning calorimetry (DSC), there is known the following thermal analyzer. In the thermal analyzer, at least a partial area of a lid member of a heating furnace configured to contain a measurement sample and a reference sample, and at least a partial area of a heating furnace cover directly above those samples are formed of transparent materials. The thermal analyzer includes a cooling unit configured to cool the heating furnace, and purge gas supply tubes, through which a purge gas is supplied toward the above-mentioned transparent materials. With the thermal analyzer, even when the sample in the heating furnace is set to a low temperature and thermally analyzed, the inside of the heating furnace can be observed without dew formation on, or frost adhesion to, the transparent materials (Japanese Patent Application Laid-open No. 2001-183319).

There is also known a thermal analyzer, which is configured to perform Thermogravimetry (TG) or Differential Thermal Analysis (DTA), and which is used to observe a sample (Japanese Patent Application Laid-open No. 2015-108540).

The related-art technologies have a problem in that, with the provision of the purge gas supply tubes, through which the purge gas is supplied toward the transparent materials provided in the lid member of the heating furnace and the heating furnace cover, an apparatus configuration is complicated.

SUMMARY OF THE INVENTION

A thermal analyzer according to the present invention includes: a heat sink, in which a measurement sample container and a reference sample container are to be placed, the measurement sample container being configured to contain a measurement sample, the reference sample container being configured to contain a reference sample; a differential heat flow detector configured to detect, under a state in which the measurement sample container and the reference sample container are placed in the heat sink, a temperature difference between the measurement sample and the reference sample caused by heat absorbed or released by the measurement sample; a measurement circuit configured to convert the temperature difference detected and input thereto by the differential heat flow detector into a DSC signal; a heat sink cover configured to cover the heat sink; a heat sink window provided in a part of the heat sink; a heat sink cover window provided in a part of the heat sink cover; an imaging device configured to image at least the measurement sample placed in the heat sink through the heat sink window and the heat sink cover window; a purge gas introduction portion, through which a purge gas is introduced into the heat sink; and a discharge port, through which the purge gas is allowed to flow from one of the heat sink window and the heat sink to a space inside the heat sink cover.

With the above-mentioned configuration, when the heat sink is cooled, the purge gas introduced into and cooled inside the heat sink is allowed to flow to the inside of the heat sink cover through the discharge port. As a result, the temperature difference between the heat sink window and the heat sink is reduced, convection caused in a space surrounded by the heat sink window and the heat sink is suppressed, and a fluctuation of the DSC signal is reduced. Further, with the purge gas having a low humidity flowing outside the heat sink window, dew formation and frost outside the heat sink window can be prevented.

Further, the thermal analyzer according to the present invention further includes a heat sink cover heater configured to heat the heat sink cover window.

With the above-mentioned configuration, the temperature of the heat sink cover window becomes higher than that of a gas in the vicinity of the heat sink cover window, and dew formation and frost outside and inside the heat sink cover window can be prevented.

Further, the thermal analyzer according to the present invention further includes an outlet port configured to blow the purge gas inside the heat sink cover at the outside of the heat sink cover window.

With the above-mentioned configuration, with the purge gas inside the heat sink cover being allowed to flow to the outside of the heat sink cover window through the outlet port, the purge gas having the low humidity is blown at the heat sink cover window, and dew formation and frost outside the heat sink cover window can be prevented.

According to the present invention, the thermal analyzer, with which the sample can be observed even under a state in which the heat sink is cooled to a room temperature or lower, is provided.

DESCRIPTION OF THE EMBODIMENTS

Now, embodiments of the present invention are described with reference to the drawings. Dimensions of respective members, for example, are changed as appropriate as long as a ratio therebetween does not particularly cause a problem.

Figure 1:
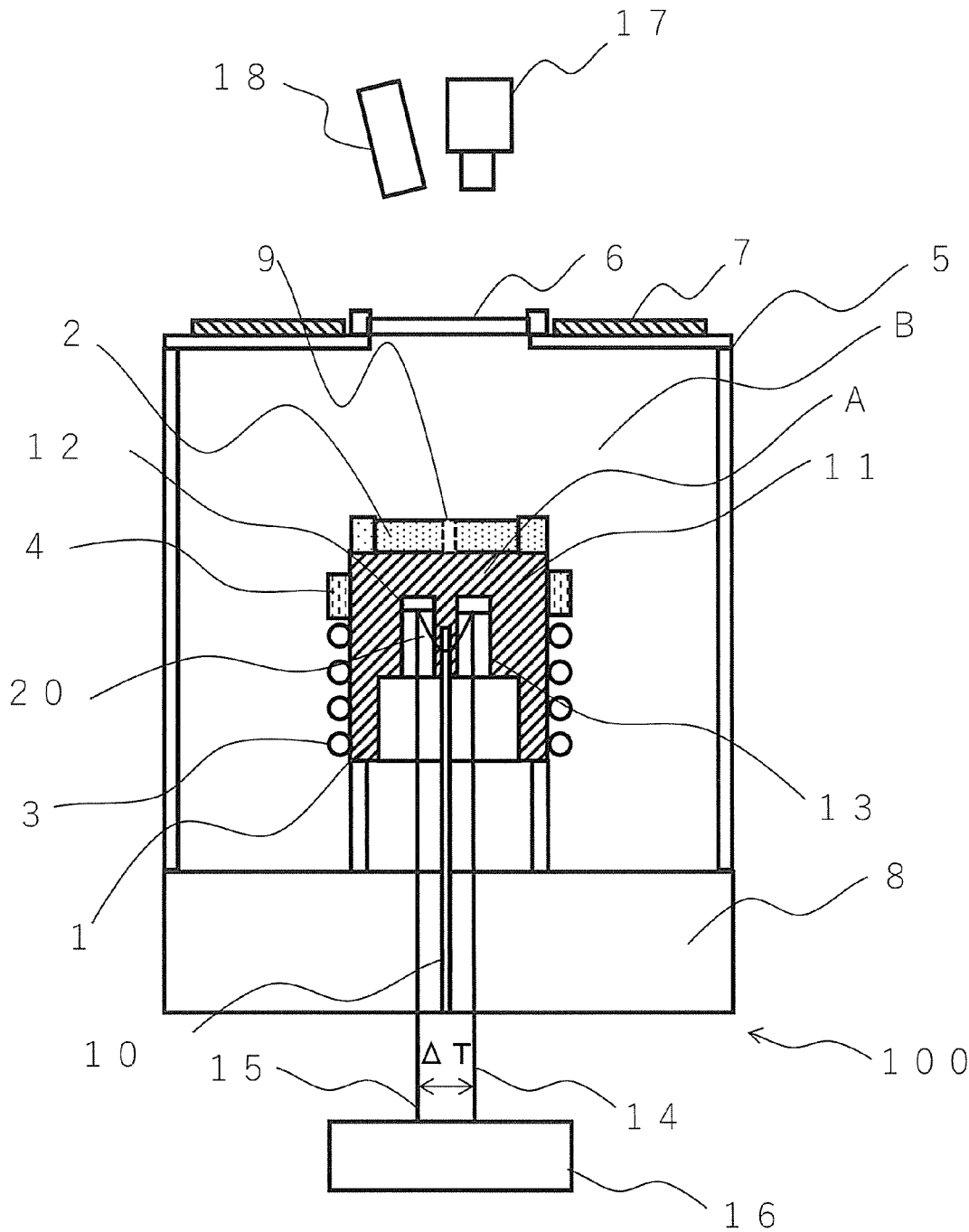
FIG. 1 is a cross-sectional view for illustrating a configuration of a thermal analyzer according to a first embodiment of the present invention.

FIG. 1 is a cross-sectional view for illustrating a configuration of a thermal analyzer according to a first embodiment of the present invention. A thermal analyzer 100 is a differential scanning calorimeter (DSC), and has a configuration similar to that of a differential scanning calorimeter of the related art except that a heat sink window 2, through which a sample inside a heat sink 1 can be observed, is provided in the heat sink 1. An outline of the thermal analyzer 100 is provided below.

In the thermal analyzer 100, a measurement sample container 11 configured to contain a measurement sample (not shown), a reference sample container 12 configured to contain a reference sample, the heat sink 1, and a thermal resistor 13, which is connected between each of the measurement sample container 11 and the reference sample container 12, and the heat sink 1 to form a heat flow path therebetween, are provided on a base 8. The thermal analyzer 100 further includes a measurement sample-side thermocouple 14, a reference sample-side thermocouple 15, and an imaging device 17, such as a CCD camera or an infrared camera, which is used to observe the sample in the heat sink 1.

The heat sink 1 can be heated with a wire-wound heat sink heater 3 wound around the periphery of the heat sink 1, or the heat sink 1 can be cooled by a heat sink cooling mechanism 4 using, for example, liquefied nitrogen or an electric cooling device, which is provided outside the heat sink.

In order to prevent exposure of the heat sink heater 3, a cover (not shown) is provided around the heat sink heater 3.

The measurement sample-side thermocouple 14 and the reference sample-side thermocouple 15 penetrate the thermal resistor 13, and have anterior ends connected to lower surfaces of the measurement sample container 11 and the reference sample container 12, respectively, to form a differential heat flow detector 20 configured to detect a temperature difference between the measurement sample and the reference sample. Meanwhile, the other ends of the measurement sample-side thermocouple 14 and the reference sample-side thermocouple 15 are drawn to the lower side of the heat sink 1 so that a detection signal output from the differential heat flow detector 20 is taken in by a measurement circuit 16, is amplified and then converted into a DSC signal by the measurement circuit 16, is recorded in a personal computer (not shown), and is further displayed on a display (not shown).

Further, the personal computer is configured to control the heat sink heater 3 and the heat sink cooling mechanism 4, to thereby perform control so that the heat sink 1 is heated or cooled.

The thermal analyzer 100 further includes a heat sink cover 5, which is provided in a circumferential portion of the heat sink 1 to cover the heat sink 1 together with the base 8, and a heat sink cover window 6 provided in a part of the heat sink cover 5 at a position at which at least the measurement sample container 11 in the heat sink 1 can be observed through the heat sink window 2 to shield the inside of the heat sink cover 5 from outdoor air.

The heat sink window 2 and the heat sink cover window 6, for which a transparent material, such as quartz glass or sapphire glass, is used, are removable from the heat sink 1 and the heat sink cover 5, respectively, so as to facilitate cleaning and replacement when surfaces thereof become dirty.

Further, above the heat sink cover window 6, and on a line that is coaxial with or different from an axis of the imaging device 17, a light source 18 configured to illuminate the measurement sample and the reference sample in the heat sink 1 through the heat sink cover window 6 is arranged so that the measurement sample is irradiated with visible light from the light source 18, and the imaging device 17 acquires a picture obtained based on electromagnetic wave of the measurement sample and the reference sample.

In order to maintain an atmosphere inside the heat sink 1 constant, prevent oxidization of the sample, and protect the heat sink from a generated gas or reactive gas from the sample, it is required to introduce an inert gas, such as nitrogen gas, argon gas, or helium gas, as a purge gas into the heat sink 1. In order to introduce the above-mentioned inert gas into the heat sink 1, a purge gas introduction portion 10 is provided below the heat sink 1.

Further, in order to release the purge gas filled in a heat sink space A inside the heat sink 1, a purge gas discharge port 9 is formed in the heat sink window 2. Through the purge gas discharge port 9, the purge gas is released into a heat sink cover space B delimited by the heat sink 1, and the heat sink cover 5 and the heat sink cover window 6. With this configuration, the heat sink space A inside the heat sink 1 and the heat sink cover space B are filled with the purge gas, and hence dew formation and frost generation on the heat sink window 2 can be suppressed.

The purge gas desirably has a low dew point, and may be dry air, for example, without being limited to the inert gas.

A plane heat sink cover heater 7 is provided around the heat sink cover window 6 so as to be in contact with the heat sink cover 5. The heat sink cover heater 7 can be heated to heat the heat sink cover window 6 through the heat sink cover 5, and hence dew formation and frost generation on the heat sink cover window 6 are suppressed.

In the related-art technologies, when the heating furnace (corresponding to the heat sink 1 in the present invention) is cooled, the purge gas close to a room temperature is blown from the purge gas supply tubes toward the transparent material (corresponding to the heat sink window 2 in the present invention) of the heating furnace. At this time, a temperature difference between the sample and the transparent material of the heating furnace is increased. As a result, convection is caused inside the heating furnace, and hence a fluctuation of the DSC signal is increased. In the present invention, the purge gas cooled in the heat sink 1 flows into the heat sink cover 5, and hence a temperature difference between the heat sink 1 and the heat sink window 2 is reduced. As a result, convection in the heat sink space A is suppressed, and the effect that a fluctuation of the DSC signal is also reduced is obtained.

Further, for the heat sink cover 5, in order to efficiently heat the heat sink cover window 6, it is preferred to use a material having a high heat conductivity, such as aluminum, copper, or silver. As the heat sink cover heater 7, a plane heater is used.

Figure 2:
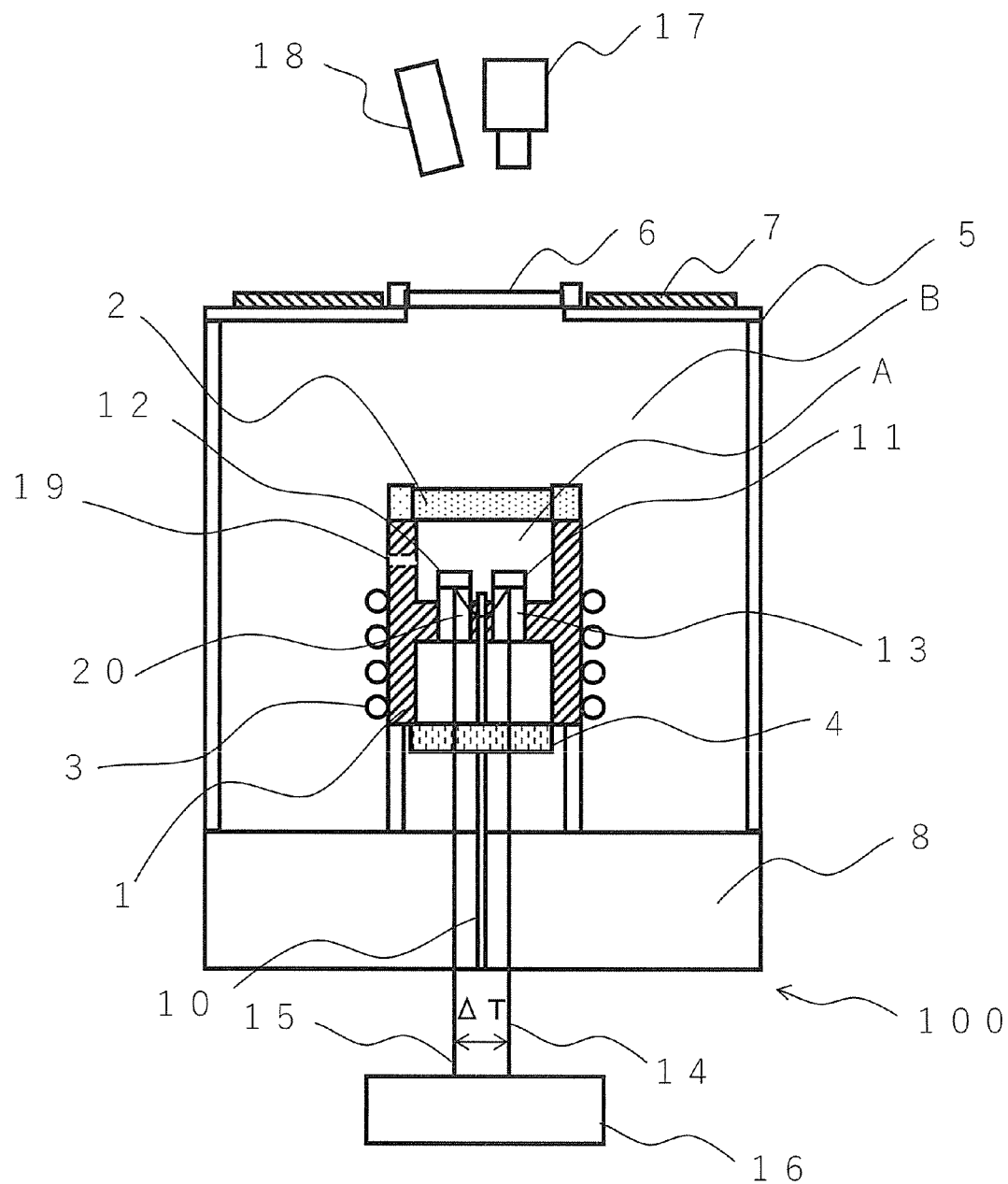
FIG. 2 is a cross-sectional view for illustrating a configuration of a thermal analyzer according to a second embodiment of the present invention.

FIG. 2 is a cross-sectional view for illustrating a configuration of a thermal analyzer 100 according to a second embodiment, which represents a modification example of the first embodiment of FIG. 1. This configuration is similar to that of the differential scanning calorimeter in the first embodiment of FIG. 1, except that a purge gas discharge port 19 is provided in the heat sink 1 instead of the heat sink window 2, and thus detailed description thereof is omitted.

Figure 3:
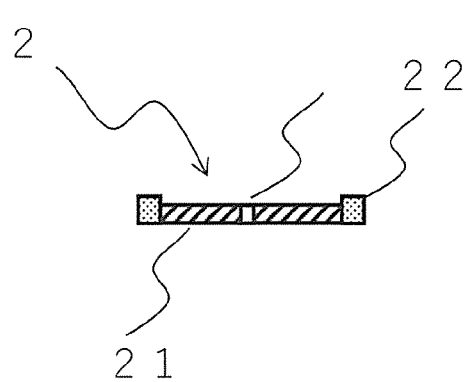
FIG. 3 is a detailed cross-sectional view of a heat sink window in the first embodiment of the present invention.

FIG. 3 is a detailed cross-sectional view of the heat sink window 2. The heat sink window 2 is formed of a transparent material 21, through which the measurement sample, for example, in the heat sink 1 can be observed with the imaging device 17, and a holding member 22, which is configured to hold the transparent material 21 around the transparent material 21, and which is made of a material having a high heat conductivity. The transparent material 21 has the purge gas discharge port 9 formed therein, and the holding member 22 is fixed or placed on the heat sink 1 to cover the inside of the heat sink 1.

As the transparent material 21, quartz glass, sapphire glass, or yttrium aluminum garnet (YAG) ceramic is used, for example, but the present invention is not limited thereto.

As the holding member 22, aluminum, copper, or silver is used, for example, but the present invention is not limited thereto.

Figure 4:
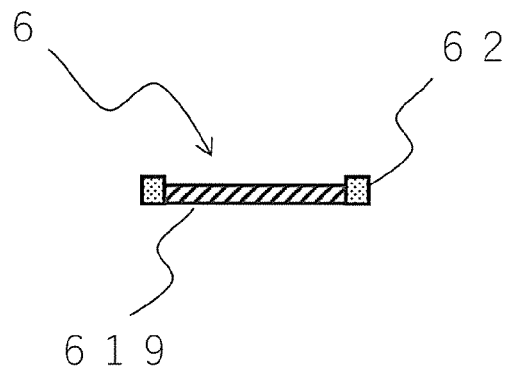
FIG. 4 is a detailed cross-sectional view of a heat sink cover window in the present invention.

FIG. 4 is a detailed cross-sectional view of the heat sink cover window 6. The heat sink cover window 6 is formed of a transparent material 61, through which the measurement sample, for example, in the heat sink 1 can be observed with the imaging device 17, and a holding member 62, which is configured to hold the transparent material 61 around the transparent material 61, and which is made of a material having a high heat conductivity. The holding member 62 is fixed or placed on the heat sink cover 5 to cover the heat sink cover 5.

As the transparent material 61, quartz glass, sapphire glass, or yttrium aluminum garnet (YAG) ceramic is used, for example, but the present invention is not limited thereto.

As the holding member 62, aluminum, copper, or silver is used, for example, but the present invention is not limited thereto.

Figure 5:
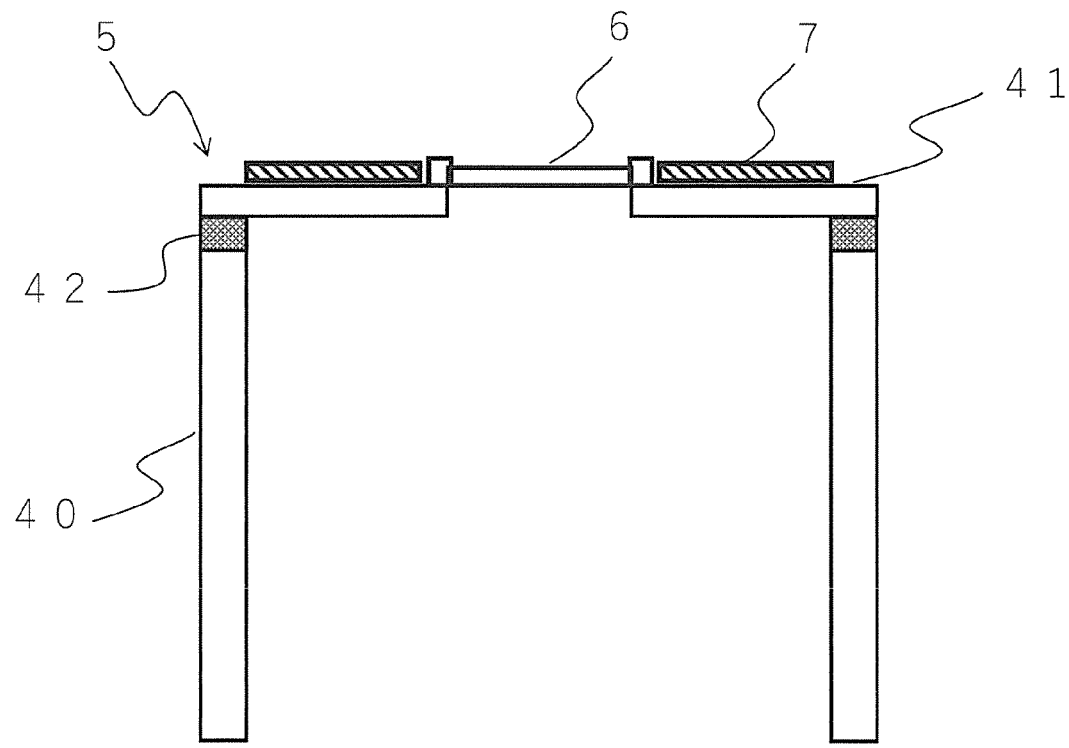
FIG. 5 is a detailed cross-sectional view of a modification example of a heat sink cover in the present invention.

FIG. 5 shows a modification example of the heat sink cover 5 in the first embodiment of FIG. 1 and the second embodiment of FIG. 2. The heat sink cover 5 is formed of a heat sink cover outer peripheral wall 40, which is connected to the base 8 and is configured to cover the periphery of the heat sink 1, a heat sink cover upper surface portion 41, which is in contact with the heat sink cover heater 7, and a sealing material 42 embedded between the heat sink cover outer peripheral wall 40 and the heat sink cover upper surface portion 41. As the sealing material 42, silicon rubber or urethane rubber, which has a low heat conductivity, is used, for example, but the present invention is not limited thereto. The heat sink cover upper surface portion 41 is made of the material having a high conductivity described in the embodiments described above, with which, when the heat sink cover heater 7 is heated, an amount of heat of the heat sink cover heater 7 is blocked by the sealing material 42 and becomes less liable to be transmitted to the heat sink cover outer peripheral wall 40, and hence the heat sink cover window 6 can be heated efficiently.

Figure 6:
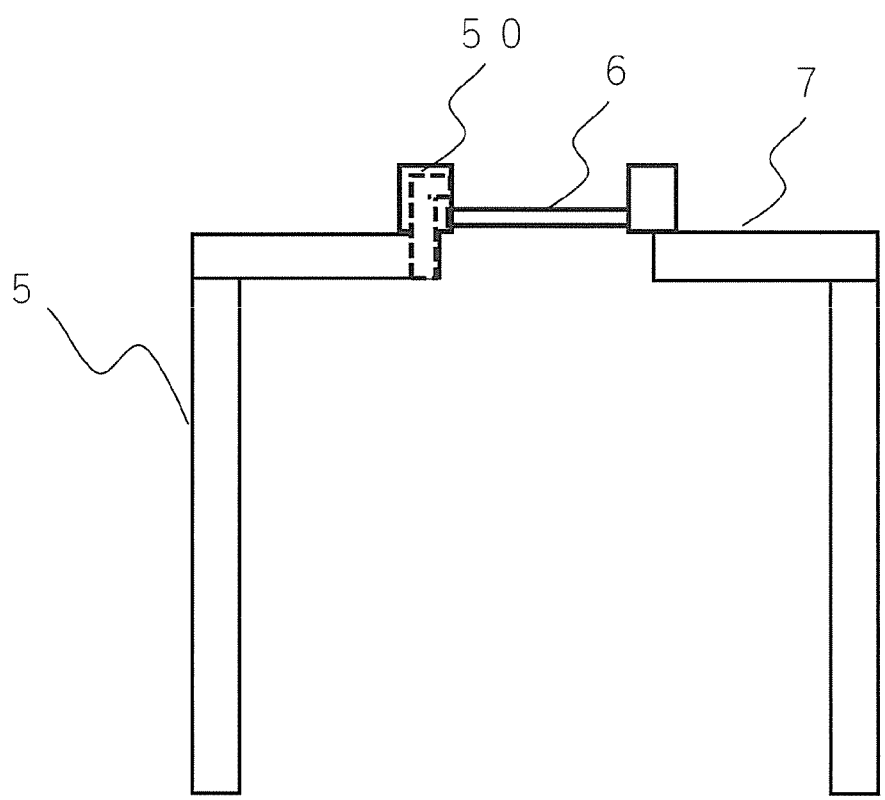
FIG. 6 is a detailed cross-sectional view of a modification example of the heat sink cover and the heat sink cover window in the present invention.

FIG. 6 shows a modification example of the heat sink cover 5 and the heat sink cover window 6. The heat sink cover 5 or the heat sink cover window 6 has formed therein a heat sink cover window through-hole 50 as a discharge port for discharging the purge gas from the heat sink cover space B filled with the purge gas to an outdoor air side outside the heat sink cover 5, and an outlet of the heat sink cover window through-hole 50 is formed into a shape with which the purge gas is blown along a surface of the transparent material 61 on an outdoor air side of the heat sink cover window 6. Therefore, the purge gas that has a low humidity and has been cooled in the heat sink space A of the heat sink 1 or the heat sink cover space B is blown at the transparent material 61, and hence a temperature difference between the outside of the transparent material 61 and the inside of the transparent material 61 is reduced. Further, with the purge gas having the low humidity being blown, dew formation and frost generation on the heat sink cover window 6 can be suppressed.

What is claimed is:

1. A thermal analyzer, comprising:
  a heat sink, in which a measurement sample container and a reference sample container are to be placed, the measurement sample container being configured to contain a measurement sample, the reference sample container being configured to contain a reference sample;
  a differential heat flow detector configured to detect, under a state in which the measurement sample and the reference sample are placed in the heat sink, a temperature difference between the measurement sample and the reference sample caused by heat absorbed or released by the measurement sample;
  a measurement circuit configured to convert the temperature difference detected and input thereto by the differential heat flow detector into a DSC signal;
  a heat sink cover configured to cover the heat sink;
  a heat sink window provided in a part of the heat sink;
  a heat sink cover window provided in a part of the heat sink cover;
  an imaging device configured to image at least the measurement sample placed in the heat sink through the heat sink window and the heat sink cover window;
  a purge gas introduction portion, through which a purge gas is introduced into an internal space of the heat sink; and
  a discharge port, through which the purge gas is allowed to flow from the internal space of the heat sink through one of the heat sink window and the heat sink to a space inside the heat sink cover.

2. The thermal analyzer according to claim 1, further comprising a heat sink cover heater configured to heat the heat sink cover window.

3. The thermal analyzer according to claim 1, further comprising an outlet port configured to blow the purge gas inside the heat sink cover at an outdoor air side of the heat sink cover window.

4. The thermal analyzer according to any one of claims 1 to 3, wherein the heat sink window is formed of a transparent material and a material having a high heat conductivity.

5. The thermal analyzer according to any one of claims 1 to 3, wherein the heat sink cover window is formed of a transparent material and a material having a high heat conductivity.

* * * * *